US008856051B1

(12) United States Patent
Song et al.

(10) Patent No.: US 8,856,051 B1
(45) Date of Patent: Oct. 7, 2014

(54) AUGMENTING METADATA OF DIGITAL OBJECTS (75) Inventors: Yang Song, San Jose, CA (US); Ming Zhao, Bellevue, WA (US)

(73) Assignee: Google Inc., Mountain View, CA (US)

(*) Notice: Subject to any disclaimer, the term of this patent is extended or adjusted under 35 U.S.C. 154(b) by 744 days.

(21) Appl. No.: 13/083,452

(22) Filed: Apr. 8, 2011

(51) Int. Cl.
*G06N 99/00* (2010.01)

(52) U.S. Cl.
CPC ............ *G06N 99/005* (2013.01)
USPC .................................. 706/12

(58) Field of Classification Search
CPC ..................................... G06N 99/005
USPC .................................... 706/12
See application file for complete search history.

(56) References Cited

U.S. PATENT DOCUMENTS

| | | | |
|---|---|---|---|
| 6,853,982 B2 | 2/2005 | Smith et al. |
| 7,039,856 B2 | 5/2006 | Peairs et al. |
| 7,107,520 B2 | 9/2006 | Gargi |
| 7,203,669 B2 | 4/2007 | Lienhart et al. |
| 8,090,621 B1 | 1/2012 | Chakrabarti et al. |
| 2002/0059221 A1 | 5/2002 | Whitehead et al. |
| 2004/0025180 A1 | 2/2004 | Begeja et al. |
| 2006/0031217 A1 | 2/2006 | Smith et al. |
| 2007/0255755 A1 | 11/2007 | Zhang et al. |
| 2008/0228749 A1 | 9/2008 | Brown |
| 2009/0172730 A1 | 7/2009 | Schiff et al. |
| 2009/0281970 A1 | 11/2009 | Mika et al. |
| 2009/0292685 A1 | 11/2009 | Liu et al. |
| 2009/0327336 A1 | 12/2009 | King et al. |
| 2010/0125539 A1 | 5/2010 | Aucouturier et al. |

OTHER PUBLICATIONS

Wang et al ("YouTubeCat: Learning to CategorizeWildWeb Videos" 2010).*
Kandola et al ("Learning Semantic Similarity" 2002).*
Ulges et al ("Learning automatic concept detectors from online video" 2009).*
Davidson et al ("The YouTube Video Recommendation System" 2010).*
Anderson, R., A local algorithm for finding dense subgraphs, In Proc. 19th Annual ACM-SIAM Symposium on Discrete Algorithms, 2008, pp. 1003-1009.
Davison, B. D., "Topical locality in the web," In Proc. 23rd Annual International ACM SIGIR Conference on Research and Development in Information Retrieval, 2004, pp. 272-279.

(Continued)

*Primary Examiner* — Lut Wong
(74) *Attorney, Agent, or Firm* — Fenwick & West LLP (57) ABSTRACT

A metadata augmentation system determines similarities between digital objects, such as digital videos, that may or may not have metadata associated with them. Based on the determined similarities, the metadata augmentation system augments metadata of objects, such as augmenting metadata of objects lacking a sufficient amount of metadata with metadata from other objects having a sufficient amount of metadata.

In one embodiment, the similarities are used to determine training sets for training of classifiers that output degrees of more specific similarities between the corresponding video and an arbitrary second video. These classifiers are then applied to add metadata from one video to another based on a degree of similarity between the videos, regardless of their respective locations within the object similarity graph.

17 Claims, 5 Drawing Sheets

(56) References Cited

OTHER PUBLICATIONS

Dumais, S., et al., "Hierarchical classification of web content," In SIGIR '00: Proceedings of the 23rd annual international ACM SIGIR conference on Research and development in information retrieval, pp. 256-263, New York, NY, USA, 2000. ACM.

Goldman, S., et al., "Enhancing supervised learning with unlabeled data," In Proc. 17th International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Mahajan, D., et al., "Image classification using the web graph," In Proc. Multimedia, Oct. 25-29, 2010, pp. 991-994.

Niebles, J. C., et al., "Extracting moving people from internet videos," in ECCV '08: Proceedings of the 10th European Conference on Computer Vision, 2008, pp. 527-540, Part IV, LNCS 5305.

Tang, L., et al., "Large scale multi-label classification via metalabeler," In Proc. 18th International Conference on World Wide Web, Apr. 20-24, 2009, pp. 211-220.

Toderici, G., et al., "Finding Meaning on YouTube: Tag Recommendation and Category Discovery," 2010, 8 Pages.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

Chang, S-F., et al., "Combining Text and Audio-Visual Features in Video Indexing," ICASSP, 2005, pp. V-1005-V-1008.

Siersdorfer, S. et al., "Automatic Video Tagging Using Content Redundancy," SIGIR'09, ACM, Jul. 19-23, 2009, pp. 395-402.

Agarwal, N., et al., "Blocking Objectionable Web Content by Leveraging Multiple Information Sources," SIGKDD Explor. Newsl., 2006, vol. 8, No. 1, pp. 17-26.

Ayad, H.G., et al., Cumulative Voting Consensus Method for Partitions with Variable Number of Clusters, IEEE Transactions on Pattern Analysis and Machine Intelligence, Jan. 2008, vol. 30, No. 1, pp. 160-173.

Ayad, H.G., et al., "On Voting-Based Consensus of Cluster Ensembles," Pattern Recognition, May 2010, vol. 43, No. 5, pp. 1943-1953.

Baluja, S., et al., "Video Suggestion and Discovery for YouTube: Taking Random Walks Through the View Graph," Proceedings of the International World Wide Web Conference, 2008, 10 pages.

Barnard, K., et al., "Matching Words and Pictures," Journal of Machine Learning Research, 2003, vol. 3, pp. 1107-1135.

Belkin, M., et al., "Manifold Regularization: A Geometric Framework for Learning from Labeled and Unlabeled Examples," Journal of Machine Learning Research, 2006, vol. 7, pp. 2399-2434.

Blei, D., et al., "Modeling Annotated Data," Proc. ACM SIGIR, 2003, pp. 127-134.

Blum, A., et al., "Combining Labeled and Unlabeled Data with Co-Training," COLT: Proceedings of the Workshop on Computational Learning Theory, Morgan Kaufmann Publishers, 1998.

Boureau, Y.L., et al., "Learning Mid-Level Features for Recognition," Conference on Computer Vision and Pattern Recognition, 2010, pp. 2559-2566.

Brubaker, S. C., et al., "On the Design of Cascades of Boosted Ensembles for Face Detection," International Journal of Computer Vision (IJCV), May 2008, vol. 77, No. 1-3, pp. 65-86.

Brubaker, S. C., et al., "Towards Optimal Training of Cascaded Detectors," Computer Vision—ECCV, Lecture Notes in Computer Science, 2006, vol. 3951/2006, pp. 325-337.

Brubaker, S. C., et al., "Towards the Optimal Training of Cascades of Boosted Ensembles," Toward Category-Level Object Recognition (CLOR), Lecture Notes in Computer Science, 2006, vol. 4170/2006, pp. 301-320.

Cao, X., et al., "Video Shot Motion Characterization Based on Hierarchical Overlapped Growing Neural Gas Networks," Multimedia Systems, Springer-Verlag 2003, School of Electrical and Electronic Engineering, Nanyang Technological University, Nanyang Avenue, Singapore, 639798, pp. 1-8.

Cao, L., et al., "Annotating Photo Collections by Label Propagation According to Multiple Similarity Cues," Proceeding of the 16th ACM international conference on Multimedia, 2008, 9 pages.

Carvalho, R., "Metadata goes where Metadata is: contextual networks in the photographic domain," ESWC 2008 Ph. D. Symposium, 2008, 5 pages.

Chang, S., et al., "Recent Advances and Challenges of Semantic Image/Video," IEEE International Conference on Acoustics, Speech and Signal Processing, 2007, 4 pages.

Chang, C.-C., et al., "LIBLINEAR: A Library for Large Linear Classification," 2010, [online] [Retrieved on Jan. 17, 2011], Software available at <http://www.csie.ntu.edu.tw/~cjlin/liblinear/>.

Chang, E., et al., "A Unified Learning Paradigm for Large-Scale Personalized Information Management," Proceedings of the Emerging Information Technology Conference, 2005.

Chou, Y.Y., et al., "A Hierarchical Multiple Classifier Learning Algorithm," Proceedings of the 15th International Conference on Pattern Recognition—ICPR 2000, vol. II, pp. 152-155.

Christoudias, C. M., et al., Co-Training with Noisy Perceptual Observations, CVPR, 2009, pp. 1-10.

Cilibrasi, R. L., et al., "A Fast Quartet Tree Heuristic for Hierarchical Clustering," Pattern Recognition, Mar. 2011, vol. 44, No. 3, pp. 662-677.

Concepción Morales, E.R., et al., "Building and Assessing a Constrained Clustering Hierarchical Algorithm," Proceedings of the 13th Iberoamerican Congress on Pattern Recognition, CIARP 2008, Sep. 9-12, 2008, pp. 211-218.

Cordella, L. P., et al., "Combining Single Class Features for Improving Performance of a Two Stage Classifier," Proceedings of the 2010 International Conference on Pattern Recognition, Aug. 23-26, 2010, pp. 4352-4355.

Cour, T., et al., "Learning from Ambiguously Labeled Images," Technical Report, U. Penn., 2009, pp. 1-8.

Day, M., et al., "Constructing Efficient Cascade Classifiers for Object Detection," Proceedings of 2010 IEEE 17th International Conference on Image Processing, Hong Kong, Sep. 26-29, 2010, pp. 3781-3784.

Dekel, O., et al., "Large Margin Hierarchical Classification," ICML, 2004, 8 pages.

Deng, J., et al., "ImageNet: A Large-Scale Hierarchical Image Database," *CVPR09*, 2009, 8 pages.

Duan, L., et al., "Domain Transfer SVM for Video Concept Detection," Proceedings of IEEE Conference on Computer Vision and Pattern Recognition (CVPR), 2009, pp. 1375-1381.

Duchenne, O., et al., "Automatic Annotation of Human Actions in Video," ICCV, 2009, 8 pages.

Dundar, M. M., et al., "Joint Optimization of Cascaded Classifiers for Computer Aided Detection," CVPR07, pp. 1-8.

Duygulu, P., et al., "Object Recognition as Machine Translation: Learning a Lexicon for a XED Image Vocabulary," Computer Vision—ECCV 2002, Proceedings of the 7th European Conference on Computer Vision, Copenhagen, Denmark, May 28-31, 2002, Part IV, pp. 97-112.

El-Sherif, E., et al., "Automatic Generation of Optimum Classification Cascades," International Conference on Pattern Recognition (ICPR), 2008, pp. 1-4.

(56) References Cited

OTHER PUBLICATIONS

El-Shishini, H., et al., "A Multistage Algorithm for Fast Classification of Patterns," Pattern Recognition Letters, Oct. 1989, vol. 10, No. 4, pp. 211-215.
Everingham, M., et al., "Hello! My Name is . . . Buffy—Automatic Naming of Characters in TV Video," BMVC, 2006, 10 pages.
Ewerth, R., et al., "Semi-Supervised Learning for Semantic Video Retrieval," Proceedings of the Conference on Image and Video Retrieval (CIVR), Amsterdam, The Netherlands, Jul. 9-11, 2007, pp. 154-161.
Fan, J., et al., "Incorporating Concept Ontology for Hierarchical Video Classification, Annotation, and Visualization," IEEE Transactions on Multimedia, Aug. 2007, vol. 9, No. 5, pp. 939-957.
Fan, R.-E., et al., "Liblinear: A library for large linear classification," Journal of Machine Learning Research, 2008, vol. 9, pp. 1871-1874.
Feng, H., et al., "A Bootstrapping Framework for Annotating and Retrieving WWW Images," Proc. ACM MM, 2004, 8 pages.
Feng, S. L., et al., "Multiple Bernoulli Relevance Models for Image and Video Annotation," Proc. CVPR, 2004, pp. 1-8.
Fergus, R., et al., "A Visual Category Filter for Google Images," ECCV, 2004.
Fergus, R., et al., "Learning Object Categories from Google's Image Search," Proceedings of the $10^{th}$ IEEE International Conference on Computer Vision (ICCV), 2005, vol. 2, pp. 1816-1823.
Foo, B., et al., "A Distributed Approach for Optimizing Cascaded Classifier Topologies in Real-Time Stream Mining Systems," IEEE Transactions on Image Processing, Nov. 2010, vol. 19, No. 11, pp. 3035-3048.
Freund, Y., et al., "A Decision-Theoretic Generalization of On-Line Learning and an Application to Boosting," Journal of Computer and System Sciences, Aug. 1997, vol. 55, No. 1, pp. 119-139.
Freund, Y., et al., "A Decision-Theoretic Generalization of On-Line Learning and an Application to Boosting," Proceedings of European Conference on Computational Learning Theory (ECCV), Barcelona, Spain, Mar. 13-15, 1995, pp. 23-37.
Giusti, N., et al., "Theoretical and Experimental Analysis of a Two-Stage System for Classification," IEEE Transactions on Pattern Analysis and Machine Intelligence (PAMI), Jul. 2002, vol. 24, No. 7, pp. 893-904.
Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.
Hays, J., et al., "IM2GPS: Estimating Geographic Information from a Single Image," Proceedings of the IEEE Conference on Computer Vision and Pattern Recognition (CVPR), 2008.
Heiseleyz, B., et al., "Feature Reduction and Hierarchy of Classifiers for Fast Object Detection in Video Images," Proceedings of the 2001 IEEE Computer Society Conference on Computer Vision and Pattern Recognition (CVPR01), Kauai, Hawaii, Dec. 8-14, 2001, vol. II, pp. 18-24.
Hore, P., et al., "A Scalable Framework for Cluster Ensembles," Pattern Recognition, May 2009, vol. 42, No. 5, pp. 676-688.
Ikizler-Cinbis, N., et al., "Learning Actions from the Web," Proceedings of $12^{th}$ International Conference on Computer Vision (ICCV), 2009, 8 pages.
Jones, M. J., et al., "Statistical Color Models with Application to Skin Detection," International Journal of Computer Vision (IJCV), Jan. 2002, vol. 46, No. 1, pp. 81-96.
Jordan, M.I., et al., "Hierarchical Mixture of Experts and the EM Algorithm," Neural Computation, 1994, vol. 6, pp. 181-214.
Kalogerakis, E., et al., "Image Sequence Geolocation with Human Travel Priors," Proceedings of the IEEE International Conference on Computer Vision (ICCV'09), 2009, 8 pages.
Kavukcuoglu, K., et al., "Learning Invariant Features Through Topographic Filter Maps," CVPR09, pp. 1605-1612.
Kukenys, I., et al., "Classifier Cascades for Support Vector Machines," 2008 $23^{rd}$ International Conference Image and Vision Computing New Zealand (IVCNZ08), Nov. 26-28, 2008, pp. 1-6.
Kumar, S., et al., "Discriminative Fields for Modeling Spatial Dependencies in Natural Images," Advances in Neural Information Processing Systems (NIPS), 2004, 8 pages.
Lafferty, J., et al., "Conditional Random Fields: Probabilistic Models for Segmenting and Labeling Sequence Data," Proceedings of International Conference on Machine Learning (ICML), 2001, 8 pages.
Laptev, I., et al., "Learning Realistic Human Actions from Movies," Proceedings of the IEEE Conference on Computer Vision and Pattern Recognition (CVPR), 2008, 8 pages.
Leung, T., et al., "Representing and Recognizing the Visual Appearance of Materials Using Three-Dimensional Textons," International Journal of Computer Vision (IJCV), 2001, vol. 43, No. 1, pp. 29-44.
Li, L., et al., "Optimol: Automatic Online Picture Collection Via Incremental Model Learning," Proc. Computer Vision and Pattern Recognition (CVPR), 2007.
Li, Y., et al., "Bagging Based Efficient Kernel Fisher Discriminant Analysis for Face Recognition," The $18^{th}$ International Conference on Pattern Recognition (ICPR06), vol. 3, pp. 523-526.
Liu, J., "Recognizing Realistic Actions from Videos "In the Wild"," Computer Vision and Pattern Recognition (CVPR), 2009, 1996-2003.
Liu, T.-Y., et al., "Support Vector Machines Classification with a Very Large-Scale Taxonomy," SIGKDD Explorations, 2005, vol. 1, pp. 36-43.
Lopez-Maury, L., "A Two-Component Signal Transduction System Involved in Nickel Sensing in the *Cyanobacterium synechocystis* sp. PCC 6803," Molecular Microbiology, 2002, vol. 43, No. 1, pp. 247-256.
Lowe, D. G., "Distinctive Image Features from Scale-Invariant Keypoints," International Journal of Computer Vision (IJCV), 2004, vol. 60, No. 2, pp. 91-110.
Luo, H., "Optimization Design of Cascaded Classifiers," CVPR05, vol. 1, pp. 480-485.
Ma, B. P., et al., "Discriminant Analysis for Perceptionally Comparable Classes," FG08, pp. 1-6.
Mangai, U. G., et al., "A Hierarchical Multi-Classifier Framework for Landform Segmentation Using Multi-Spectral Satellite Images—A Case Study Over the Indian Subcontinent," 2010 Fourth Pacific-Rim Symposium on Image and Video Technology, (PSIVT10), Nov. 14-17, 2010, Singapore, pp. 306-313.
Mirzaei, A., et al., "Combining Hierarchical Clusterings Using Min-Transitive Closure," ICPR08, pp. 1-4.
Montagnuuolo, M., et al., "Parallel Neural Networks for Multimodal Video Genre Classification," Multimedia Tools and Applications, Jan. 2009, vol. 41, pp. 125-159.
Nam, M. Y., et al., "Cascade of Fusion for Adaptive Classifier Combination Using Context-Awareness," AMDO06, pp. 252-261.
Neapolitan, R. E., "Learning Bayesian Networks," Prentice Hall, Upper Saddle River, NJ, USA, 2003.
Neven, H., et al., "Image Recognition with an Adiabatic Quantum Computer I. Mapping to Quadratic Unconstrained Binary Optimization," 2008, pp. 107.
Nister, D., et al., "Scalable Recognition with a Vocabulary Tree," CVPR '06: Proceedings of the 2006 IEEE Computer Society Conference on Computer Vision and Pattern Recognition, IEEE Computer Society, Washington, DC, USA, Jun. 2006, vol. 2, pp. 2161-2168.
"OpenDirectoryProject," 1998-2010, [online] [Retrieved on Jan. 16, 2011] Retrieved from the internet <URL:http://www.dmoz.org/>.
Patterson, R. D., et al., "Complex Sounds and Auditory Images," Proc. Auditory Physiology and Perception, 1992, pp. 429-446.
Qi, G.-J., et al., "Correlative Multilabel Video Annotation with Temporal Kernels," ACM Transactions on Multimedia Computing, Communications, and Applications, 2008, vol. 5, No. 1, Article 3, pp. 1-27.
Quost, B., et al., "Pairwise Classifier Combination Using Belief Functions," Pattern Recognition Letters (PRL), Apr. 1, 2007, vol. 28, No. 5, pp. 644-653.
Raina, R., et al., "Self-Taught Learning: Transfer Learning from Unlabeled Data," Proceeding of International Conference on Machine Learning (ICML), Corvallis, OR, 2007, pp. 759-166.

(56) References Cited

OTHER PUBLICATIONS

Ramachandran, C., et al., "VideoMule: A Consensus Learning Approach to Multi-Label Classification from Noisy User-Generated Videos," ACM Multimedia, 2009, 4 pages.
Ranzato, M., et al., "Modeling Pixel Means and Covariances using Factorized Third-Order Boltzmann Machines," Proceedings of the IEEE Conference on Computer Vision and Pattern Recognition (CVPR10), 2010, pp. 2551-2558.
Ranzato, M., et al., "Unsupervised Learning of Invariant Feature Hierarchies with Applications to Object Recognition," CVPR07, pp. 1-8.
Rehn, M., et al., "Sound Ranking Using Auditory Sparse-Code Representations," Proc. ICML: Workshop on Sparse Methods for Music Audio, 2009, 3 pages.
Rodriguez, M., et al., "Automatic Metadata Generation Using Associative Networks," ACM Transactions on Information Systems, Feb. 2009, pp. 7:1-7:20, vol. 27, No. 2, Article 7.
Rodriguez, J. J., "Forests of Nested Dichotomies," Pattern Recognition Letters (PRL), Jan. 15, 2010, vol. 31, No. 2, pp. 125-132.
Sargin, E. M., et al., "Audiovisual Celebrity Recognition in Unconstrained Web Videos," Proc. ICASSP, 2009, 4 pages.
Schapire, R. E., "The Boosting Approach to Machine Learning: An Overview," MSRI Workshop on Nonlinear Estimation and Classification, 2002, pp. 1-23.
Schapire, R. E., et al., "Boosting the Margin: A New Explanation for the Effectiveness of Voting Methods," The Annals of Statistics, 1998, vol. 26, No. 5, pp. 1651-1686.
Schindler, G., et al., "Internet Video Category Recognition," First IEEE Workshop on Internet Vision, CVPR, 2008, 7 pages.
Serdyukov, P., et al., "Placing Flickr Photos on a Map," SGIR'09: Proceedings of the 32$^{nd}$ International ACM SIGIR Conference on Research and Development in Information Retrieval, 2009, New York, NY, USA, pp. 484-491.
Singh, R., et al., "Reduced-Complexity Delayed-Decision Algorithm for Context-Based Image Processing Systems," IEEE Transaction on Image Processing, Aug. 2007, vol. 16, No. 8, pp. 1937-1945.
Slonim, N., et al., "Discriminative Feature Selection via Multiclass Variable Memory Markov Model," Proceedings of the Nineteenth International Conference on Machine Learning, 2002, 8 pages.
Smeaton, A. F., et al., "Evaluation Campaigns and TRECVid," Proceedings of the 8$^{th}$ ACM International Workshop on Multimedia Information Retrieval, ACM Press, Oct. 26-27, 2006, pp. 321-330.
Snoek, C., et al., "The MediaMill TRECVID 2008 Semantic Video Search Engine," 2009, 14 pages.
Snoek, C. G.M., et al., "Early Versus Late Fusion in Semantic Video Analysis," ACM Multimedia 2005, Nov. 6-11, 2005, Singapore, 4 pages.
Song, Y., et al., "Taxonomic Classification for Web-Based Videos," Conference on Computer Vision and Pattern Recognition (CVPR), 2010.
Su, Y., et al., "Hierarchical Ensemble of Global and Local Classifiers for Face Recognition," IP, Aug. 2009, vol. 18, No. 8, pp. 1885-1896.
Sun, A., et al., "Hierarchical Text Classification and Evaluation," Proceedings of the 2001 IEEE International Conference on Data Mining (ICDM), Nov. 2001, pp. 521-528.
Sun F., et al., "Two-Stage Computational Cost Reduction Algorithm Based on Mahalanobis Distance Approximations," ICPR00, vol. II, pp. 696-699.
Szczot, M., et al., "Package Boosting for Readaption of Cascaded Classifiers," 2010 International Conference on Pattern Recognition (ICPR10), pp. 552-555.
Tola, E., et al., "A Fast Local Descriptor for Dense Matching," Proceedings of IEEE Conference on Computer Vision and Pattern Recognition (CVPR), 2008, Alaska, USA, pp. 1-15.
Van Laere, O., et al., "Towards Automated Georeferencing of Flickr Photos," GIR'10: Proceedings of the 6$^{th}$ Workshop on Geographic Information Retrieval, Feb. 18-19, 2010, pp. 1-7.
Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.
Visentini, I., et al., "Cascaded Online Boosting," Journal of Real-Time Image Processing, Dec. 2010, vol. 5, No. 4, pp. 245-257.
Visentini, I, et al., "On-Line Boosted Cascade for Object Detection," ICPR08, pp. 1-4.
Vuurpijl, L., et al., "An Overview and Comparison of Voting Methods for Pattern Recognition," Proceedings of the Eighth International Workshop on Frontiers in Handwriting Recognition (IWFHR02), 2002, pp. 195-200.
Vuurpijl, L., et al., "Architectures for Detecting and Solving Conflicts: Two-Stage Classification and Support Vector Classifiers," International Journal on Document Analysis and Recognition (IJDAR), Jul. 2003, vol. 5, No. 4, pp. 213-223.
Wang, P., et al., "Training a Multi-Exit Cascade with Linear Asymmetric Classification for Efficient Object Detection," Proceedings of 2010 IEEE 17$^{th}$ International Conference on Image Processing (ICIP10), Hong Kong, Sep. 26-29, 2010, pp. 61-64.
Wu, D., et al., "A Min-Max Framework of Cascaded Classifier with Multiple Instance Learning for Computer Aided Diagnosis," Proceedings of IEEE Computer Society Conference on Computer Vision and Pattern Recognition (CVPR09), 2009, pp. 1359-1366.
Wu D., et al., "Resilient Subclass Discriminant Analysis," ICCV09, pp. 389-396.
Wu, J. X., et al., "Fast Asymmetric Learning for Cascade Face Detection," IEEE Transactions on Pattern Analysis and Machine Intelligence (PAMI), Mar. 2008, vol. 30, No. 3, pp. 369-382.
Wu, X., et al., "Incorporating Prior Knowledge with Weighted Margin Support Vector Machines," Proceedings of the International Conference on Knowledge Discovery and Data Mining (SIGKDD), 2004, pp. 326-333.
Yagnik, J., et al., "Learning People Annotation from the Web Via Consistency Learning," Proc. Workshop on MIR, Augsburg, Bavaria, Germany, Sep. 28-29, 2007, pp. 285-290.
Yan, S.Y., et al., "Matrix-Structural Learning (MSL) of Cascaded Classifier from Enormous Training Set," Computer Vision and Pattern Recognition (CVPR07), 2007, pp. 1-7.
Yanai, K., et al., "Probabilistic Web Image Gathering," Proc. ACM SIGMM Workshop on MIR, 2005, pp. 57-64.
Yang, J., et al., "Cross-Domain Video Concept Detection Using Adaptive SVMS," Proceedings of the 15$^{th}$ International Conference on Multimedia, Sep. 2007, Augsburg, Bavaria, Germany, 10 pages.
Yang, L., et al., "Multi-Modality Web Video Categorization," Proc. MIR, 2007, ACM Press, pp. 265-274.
"YouTube—Broadcast Yourself," 2011, [online] [Retrieved on Jan. 16, 2011] Retrieved from the internet <URL:http://www.youtube.com>.
Zanetti, S., et al., "A Walk Through the Web's Video Clips," First IEEE Workshop on Internet Vision, Computer Vision and Pattern Recognition (CVPR08), 2008, 8 pages.
Zhang, B.C., et al., "Discriminant Analysis Based on Kernelized Decision Boundary for Face Recognition," AVBPA05, LNCS 3546, 2005, pp. 966.
Zhang, H., et al., "Automatic Partitioning of Full-Motion Video," Multimedia Systems, 1993, vol. 1, No. 1, pp. 10-28.
Zhang, X.Q., "Clustering by Evidence Accumulation on Affinity Propagation," ICPR08, 2008, pp. 1-4.
Zhao, M., et al., "Large Scale Learning and Recognition of Faces in Web Videos," Proceedings of the 8$^{th}$ IEEE International Conference on Automatic Face and Gesture Recognition, 2008, 7 pages.
Zhao, R., et al., "Narrowing the Semantic Gap—Improved Text-Based Web Document Retrieval Using Visual Features," IEEE Transactions on Multimedia, Jun. 2002, vol. 4, No. 2, pp. 189-200.
Zheng, Y.-T., et. al, "Tour the World: Building a Web-Scale Landmark Recognition Engine", Proceedings of the International Conference on Computer Vision and Pattern Recognition, Jun. 2009, Miami, Florida, U.S.A., pp. 1-8.
Zhu, X., et al., "Learning from Labeled and Unlabeled Data with Label Propagation," CMU CALD Tech Report CMU-CALD-02-107, 19 pages.
Zhu, X., "Semi-Supervised Learning Literature Survey," Computer Sciences Technical Report 1530, University of Wisconsin—Madison, 2005, pp. 1-38.

* cited by examiner

AUGMENTING METADATA OF DIGITAL OBJECTS

BACKGROUND

1. Field of Art

The present invention generally relates to storage and manipulation of digital content, and more specifically, to methods of augmenting the metadata of existing videos or other digital objects.

2. Background of the Invention

Video hosting services, such as YOUTUBE™, have become an increasingly popular way of sharing and viewing digital videos, with users contributing tens of millions of videos each year. Accurate labeling of a video is of great value in such systems, permitting users to search for videos corresponding to given labels, the video hosting service itself to train classifiers for video concepts using the label metadata, and the like.

Unfortunately, the user-supplied label metadata is in many cases incomplete or inaccurate. For example, a user submitting a video might make unintentional errors such as misspellings when supplying label metadata in association with the video, or might fail to make the effort to provide much or any descriptive textual metadata. A user submitting a video might also intentionally provide false label metadata, e.g. as "spam" to induce other users to view the video. Thus, a user searching for a video representing a particular concept might fail to find a relevant video because it lacked a description of the concept within its metadata, or might find a non-relevant video falsely labeled as representing the concept. In either case, the quality of the user's experience is significantly reduced.

SUMMARY

A metadata augmentation system determines similarities between digital objects, such as digital videos, that may or may not have metadata associated with them. Based on the determined similarities, the metadata augmentation system augments metadata of objects, such as augmenting metadata of objects lacking a sufficient amount of metadata with metadata from other objects having a sufficient amount of metadata.

In one embodiment, the similarities between the digital objects are determined based on intrinsic or semi-intrinsic factors, such as content of the digital objects themselves, or of their associated metadata. In another embodiment, the similarities are determined based on extrinsic factors such as records of prior user behavior with respect to the objects, e.g., co-play information for digital video objects.

In one embodiment, the determined similarities are used to directly propagate metadata from one object to that of another object, e.g., based on path lengths of an object similarity graph constructed using the similarities. In another embodiment, rather than being used to directly propagate metadata, the similarities are instead used to determine training sets for training of classifiers that output degrees of more specific similarities between the corresponding video and an arbitrary second video. These classifiers are then applied to add metadata from one video to another based on a degree of similarity between the videos, regardless of their respective locations within the object similarity graph.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
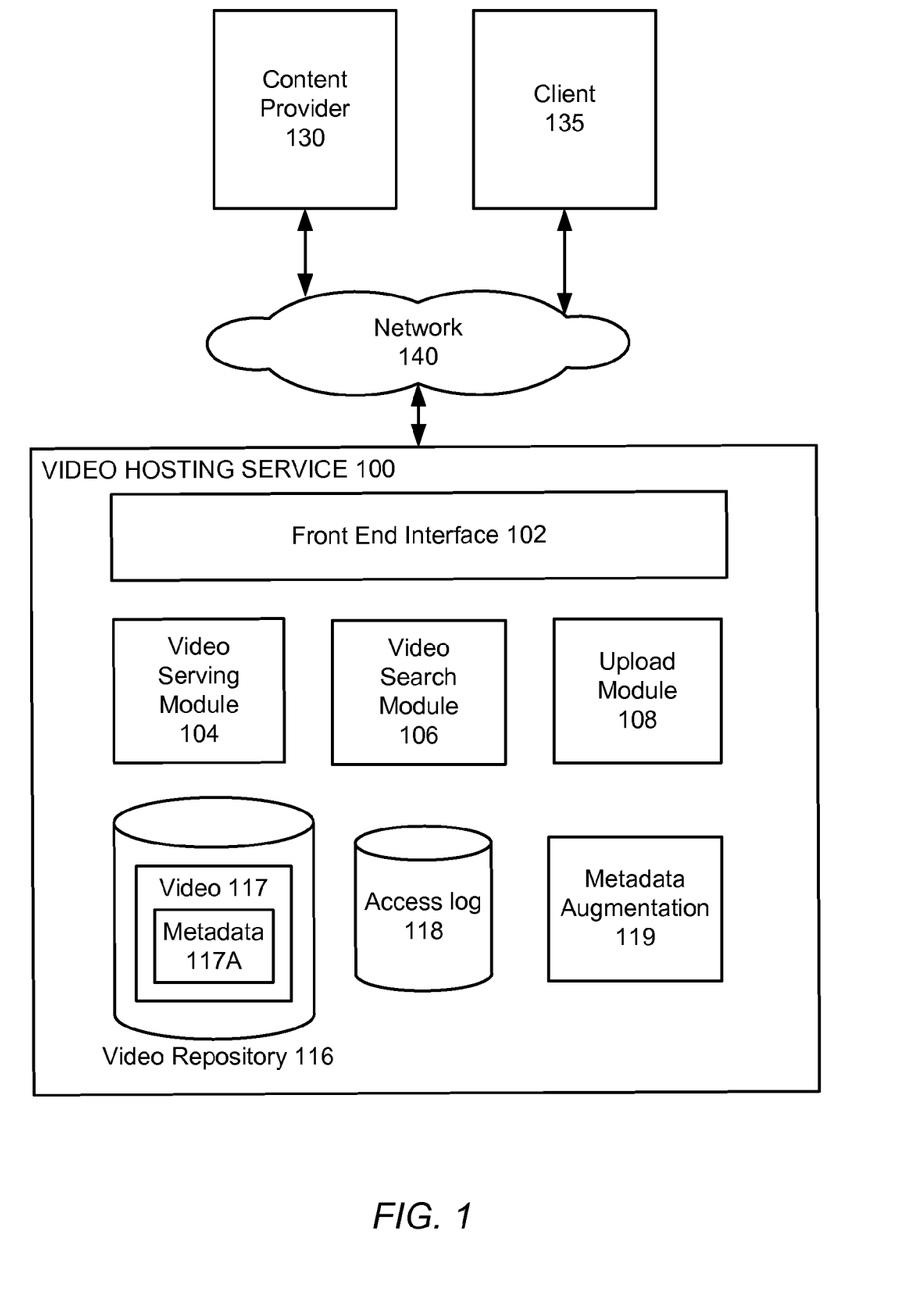
FIG. 1 is a block diagram of a video hosting service in which classifier training can be employed, according to one embodiment.

Preliminarily, note that the metadata augmentation described herein is broadly applicable to many different types of digital objects for which metadata can be provided, such as video, audio, images, textual documents, multimedia documents, and the like. In order to provide a more concrete example, however, the below describes a metadata augmentation system oriented toward digital video, in particular. Thus, FIG. 1 is a block diagram of a video hosting service 100 in which metadata augmentation can be employed, according to one embodiment. The video hosting service 100 represents a service such as that of YOUTUBE™ that stores and provides videos to users via client devices 135. The video hosting service 100 communicates with a plurality of content providers 130 and client devices 135 via a network 140 to facilitate sharing of video content between users. The video data from the content providers 130, including both video content and associated metadata, serves as input that allows metadata to be added from one video to another. Note that for the sake of clarity FIG. 1 depicts only one instance of content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The network 140 represents the communication pathways between the content providers 130 and the clients 135. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The video hosting service 100 operates on the video data from the content providers 130 when augmenting video metadata. The video hosting service includes a front end interface 102, a video serving module 104, a video search module 106, an upload server 108, a video repository 116, and an access log 118. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers."

The upload module 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who provided (e.g., uploaded) the video.

In one embodiment, in addition to the textual metadata directly supplied by the user providing the video, the metadata 117A includes metadata derived from the user-supplied textual metadata. For example, the user-supplied textual metadata may be supplied to an algorithm that maps the textual metadata to weights associated with a set of clusters, each cluster representing a related set of content. In one embodiment, the clusters are groups of textual words having some degree of semantic commonality, such as a cluster having the related words "lyrics song album lyric artist artists oh lirycs", or "hotels hotel accommodation accomodation bed-and-breakfast b&b cheap uk." For example, in one embodiment there are 500,000 clusters, and for a given video, the algorithm assigns a weight in the range [0, 1] relative to each cluster based on how strongly the textual metadata for the video is associated with that cluster. In one embodiment, the textual metadata is mapped to weights associated with clusters by use of a probabilistic model having nodes representing random variables for words and clusters.

The access log 118 stores information describing each access to any video by any viewer. Thus, each video effectively has an associated list of viewers. Each individual viewer is assigned an ID, for example, based on his or her IP address to differentiate the individual viewers. In one embodiment, this viewer ID is an anonymized viewer ID that is assigned to each individual viewer to keep viewer identities private, such as an opaque identifier such as a unique random number or a hash value. The system then can access each viewer's demographic information without obtaining his or her identity. In an alternative embodiment, the actual identity of the viewers may be known or determinable. In any case, for each viewer, the access log 118 tracks the viewer's interactions with videos. In one embodiment, each entry in the access log 118 identifies a video being accessed, a time of access, an IP address of the viewer, a viewer ID if available, cookies, the viewer's search query that led to the current access, and data identifying the type of interaction with the video. Interaction types can include any viewer interactions in the viewer interface of the website, such as playing, pausing, rewinding and forwarding a video. The various viewer interaction types are considered viewer events that are associated with a given video. For example, one entry might store that a viewer at a given IP address started viewing a particular video at time 0:00:00 and stopped viewing at time 0:34:29.

The video hosting service 100 further comprises a metadata augmentation system 119 that determines similarities between videos 117 and, based on the determined similarities, augments the metadata of some videos having little or no metadata with metadata from other videos having more substantial metadata. In one embodiment, the metadata augmentation system 119 is part of the video hosting service 100, as depicted in FIG. 1. In another embodiment, the metadata augmentation system 119 is separate from the video hosting service 100, receiving input from it and providing output to it. The metadata augmentation system 119 is described in greater detail in FIG. 2.

The video hosting service 100 may be implemented using a single computer, or a network of computers, including cloud-based computer implementations. The computers are typically server class computers including one or more high-performance CPUs and 1G or more of main memory, as well as 500 Gb to 2 Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Figure 2:
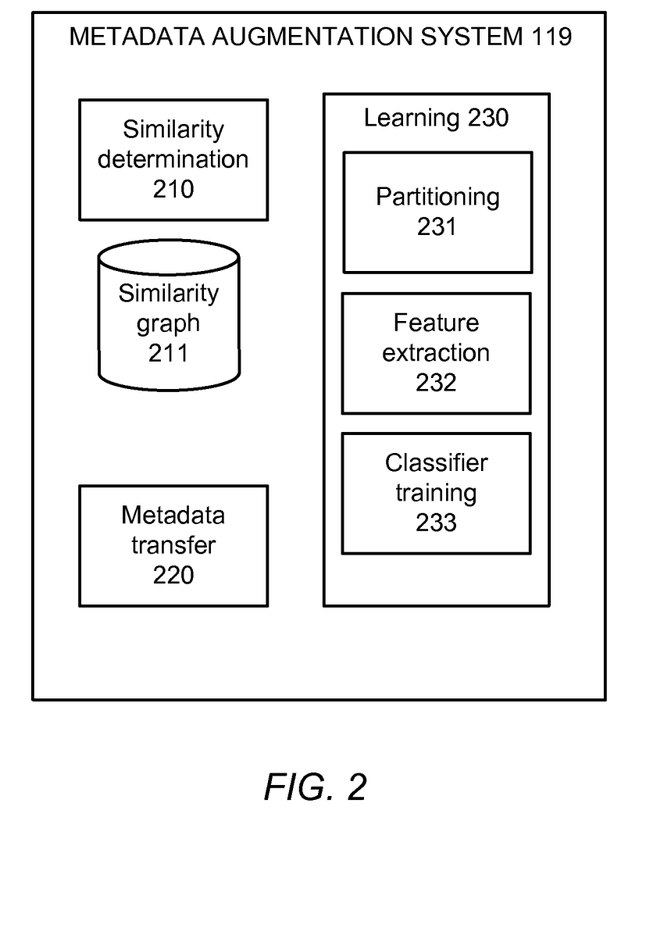
FIG. 2 illustrates the various components of a metadata augmentation system used to add metadata from one object to another, according to one embodiment.

FIG. 2 illustrates the various components of the metadata augmentation system 119, according to one embodiment. The metadata augmentation system 119 comprises a similarity determination module 210 that determines similarities between digital objects, such as the videos 117 of FIG. 1. The metadata augmentation system 119 further comprises a metadata transfer module 220 that uses the determined similarities to augment the metadata of some videos having little or no metadata with metadata from other videos having more substantial metadata. In one embodiment, the metadata transfer module 220 uses a learning module 230 to effect the metadata augmentation. These modules are now described in greater detail.

The similarity determination module 210 determines similarities between pairs of the videos, and in one embodiment constructs a graph that describes the similarity relationships and that is used by the metadata transfer module 220 to effect the metadata augmentation. The similarities may be determined in different ways in different embodiments. For example, in one embodiment the similarity determination module 210 examines extrinsic factors, such as consulting the play log 118 of FIG. 1 to determine co-play counts of the two videos—that is, the videos that are played directly before or after it, or within some set time period of it (e.g., 20 minutes), by the same user. The co-play count can then be considered one measure of similarity, on the assumption that videos watched near in time by the same user are reasonably likely to represent the same subject matter.

As another example, in another embodiment the similarity determination module 210 considers intrinsic factors, such as the content of the videos 117 themselves, and/or their associated metadata 117A, when computing the similarity between two videos. The comparison may be directly between the content and/or metadata itself, or between abstractions thereof, such as the features extracted by a feature extraction module 232. The feature extraction module 232 is discussed in further detail below.

In one embodiment, the determined similarities are used to construct a graph 211 of the videos, in which the nodes represent videos, and the edges between two videos indicate that the two videos have some threshold degree of similarity. That is, for any two videos, the determined similarity between those videos is compared to some predetermined similarity threshold, and an edge is added to the graph if the degree of similarity is greater than the threshold. The similarity degree may then be associated with the edge. In one embodiment, one technique can be used to determine whether there should be an edge between the various videos, and another technique to determine the actually degree of the similarity. For example, co-play counts might be used to determine whether there should be an edge between a pair of videos, and then content similarity (or a combination of co-play counts and content similarity) to determine the degree of the similarity.

Figure 3:
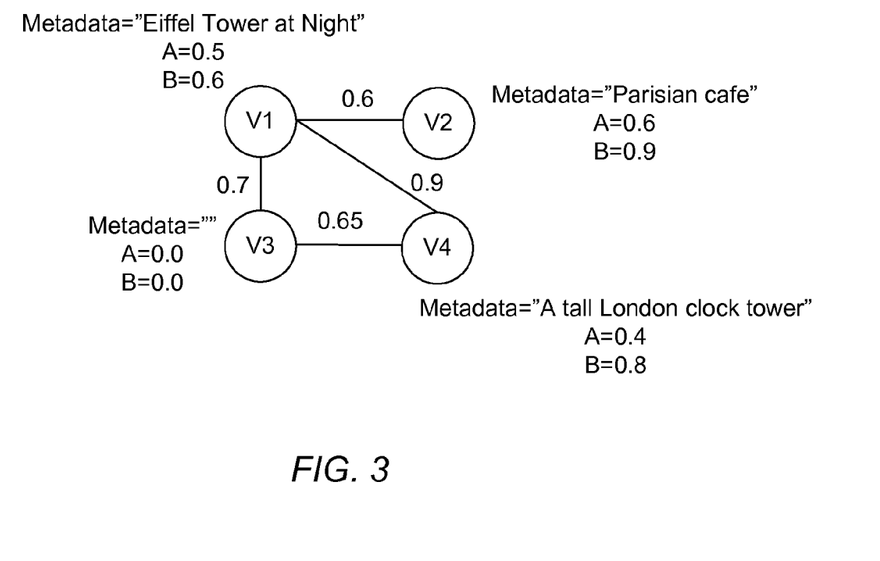
FIG. 3 illustrates a simple similarity graph produced by the metadata augmentation system in one embodiment.

FIG. 3 illustrates a simple similarity graph 211 for purposes of illustrating different example propagation techniques. The example graph contains four nodes, $V_1$-$V_4$, corresponding to four videos 117 from the video repository 116. The edges between the nodes indicate that the similarity determination module 210 found there to be at least a threshold degree of similarity between those videos, and the real number associated with each edge represents that degree of similarity, normalized to the range [0.0, 1.0], with higher values representing greater similarity. In the example of FIG. 3, the videos may have user-provided textual metadata, such as video title "Eiffel Tower at Night" for video $V_1$. Additionally, the metadata for each video includes two associated weights for clusters named 'A' and 'B', and as noted above, these weights may be derived by an algorithm that takes the textual metadata as input. Video $V_3$ lacks associated textual metadata, as indicated by the empty string, and thus its clusters A and B both have weights of 0.0.

The metadata transfer module 220 applies the determined similarities to augment the metadata of videos having little or no metadata with metadata from other videos having more substantial metadata. The augmentation may be accomplished with different techniques in different embodiments, such as by direct propagation, or by the training and application of video similarity classifiers.

Metadata Propagation Based on Graph Similarity

More specifically, in the direct propagation technique, the metadata of one node (or a derived form thereof) is propagated from one node to another based on degrees of similarity between nodes as measured based on paths between the nodes in the similarity graph 211. These paths are hereinafter referred to as "path degrees of similarity."

In one approach to propagation, path degrees of similarity are calculated based purely on the shortest graph path lengths between the nodes, using path length and a predetermined decay factor to appropriately reduce the cluster weights. In one embodiment, each cluster weight is reduced by a factor of $k^l$, where k is the decay factor, and l is the path length. For example, when transferring the cluster weights A=0.4 and B=0.8 from $V_4$ to $V_3$, the path degree of similarity between $V_4$ and $V_3$ is calculated as 0.5, assuming a decay factor k of 0.5 and given the shortest path length l of 1 between $V_4$ and $V_3$, and thus a reduction by a factor of $0.5^1$. Thus, the weights are A and B are multiplied by 0.5, yielding adjusted cluster weights to transfer of A=0.2 and B=0.4. Similarly, when transferring the cluster weights A=0.6 and B=0.9 from $V_2$ to $V_3$, which has a shortest path length of 2, the path degree of similarity is $0.5^2$, and the cluster weights are accordingly reduced by this factor. Reduction of the cluster weights before transferring them from a source node to a target node reflects the fact that although there is some similarity between the source and target nodes, the similarity is not perfect, and thus the cluster weights should not be copied as-is.

In an alternate approach to propagation, the path degree of similarity is calculated based on the degrees of similarity associated with the edges in a path between the nodes. For example, when transferring cluster weights from $V_2$ to $V_3$, the product of the similarity degrees along the path from $V_2$ to $V_1$ to $V_3$ is the product of 0.6 (the similarity degree corresponding to the edge between $V_1$ and $V_2$) and 0.7 (the similarity degree corresponding to the edge between $V_1$ and $V_3$), or 0.42. Thus, the cluster weights A=0.6 and B=0.9 are reduced by a factor of 0.42—the path degree of similarity—before being transferred to $V_3$.

In one embodiment, all nodes N in the similarity graph G (211) are augmented using the metadata (e.g., the cluster weightings) of all other nodes $N_O$. Nodes lacking a sufficiently close relationship with N may be excluded as sources of metadata augmentation of N. For example, in FIG. 3, node $V_3$ might be excluded as a source of metadata augmentation for $V_2$ based on its product of similarity degrees 0.7*0.6=0.42 along the path from $V_3$ to $V_2$ having the greatest such product, assuming a cutoff threshold of at least 0.5. Further, nodes lacking metadata, or a sufficient quantity of metadata, may be similarly excluded as source of augmentation, such as being within some maximum path length of N, or having some minimum product of similarity degrees. Thus, $V_3$ in FIG. 3 would be excluded as a source of metadata augmentation for any of the nodes. Algorithmically, the augmentation may be expressed:

For every node N in graph G:
Determine all the other nodes $N_O$ in G (i.e., $N_O$=G−N);
Optionally, remove any node in $N_O$ that is not sufficiently close to N;
Optionally, remove any node in $N_O$ that lacks a sufficient amount of metadata;
Set the metadata of N to include the combination of metadata of the nodes remaining in $N_O$.

The metadata from the different nodes $N_O$ may be combined in different ways, such as summing cluster weights and computing the average cluster weight. For example, if $V_2$ were updated with node $V_1$'s cluster weightings A=0.5, B=0.6 weighted by the similarity value 0.6 associated with the edge between $V_1$ and $V_2$ (producing weights A=0.3, B=0.36), and with node $V_4$'s cluster weightings A=0.4, B=0.8, weighted by the similarity value 0.6*0.9 on the path from $V_2$ to $V_1$ to $V_4$ (producing weights A=0.216, B=0.432), the summed cluster weights for $V_2$ would be A=0.6+0.3+0.216=1.116, B=0.9+0.36+0.432=1.692, and the average cluster weights would be A=1.116/3=0.372, B=1.692/3=0.564. Note that combining the metadata not only addresses the aforementioned problem of a lack of user-supplied metadata, but also addresses the problem of intentionally (i.e., spam) or unintentionally spurious user-supplied metadata, since the value of the spurious user-supplied metadata is largely diluted by that of the other nodes.

Metadata Propagation Based on Video Classifiers

Referring again to FIG. 2, in another embodiment, rather than directly propagating the metadata, the metadata transfer module 220 instead uses the learning module 230 to train video classifiers for the various videos that output a degree of similarity between the classifier's corresponding video and other videos. More specifically, a partitioning module 231 partitions the videos 117, or some selected subset thereof, into training sets and validation sets, and further partitions both the training and validation sets into positive and negative training subsets. In one embodiment, the partitioning module 231 randomly selects 15% of videos to use as the validation set, and uses the remaining 85% of the videos as the training set. Then, for each video V, the partitioning module 231 partitions both the training set and validation set into some positive subset of videos representing V and some negative subset of videos not representing V. The determination of which videos 117 to put in the training sets is based on the similarity graph 211 computed by the similarity determination module 210. That is, for a given video V, and any other video $V_O$, a path degree of similarity between V and $V_O$ is computed in the same way as with the direct propagation technique described above. Then, if the path degree of similarity is beyond some predetermined threshold, the partitioning module 231 places $V_O$ in the positive training or positive validation set for V; if the path degree of similarity is below some second predetermined threshold lower than the first predetermined threshold, in contrast, $V_O$ is instead placed in a negative training or negative validation set for V.

With the positive and negative training sets determined, a feature extraction module 232 derives relevant features from the various videos in the training sets, and a classifier training module 233 trains classifiers for each video V, each classifier taking an arbitrary video as input and outputting a degree of similarity between that video and V. These modules are now described in further detail.

The feature extraction module 232 derives features from the videos of the training set, the features serving as descriptive representations of their respective videos for use in training the video classifiers. In one embodiment, the following features are derived:

Audiovisual Features:

A number of distinct types of features are extracted from the audiovisual content of the video itself, including:

A histogram of local features sampled at sparse interest points using a Laplacian-of-Gaussian (LoG) or Scale Invariant Feature Transform (SIFT) feature extractor, with local descriptors being computed using Gabor wavelet responses at different orientations, spatial scales, and spatial offsets;

A color histogram computed using hue and saturation in HSV color space;

Motion rigidity features;

Pornography detection features based on a boosting-based classifier in addition to frame-based pornography detection features;

Audio features such as Stabilized Auditory Image (SAI) features and audio spectrogram;

Color motion defined as the cosine distance of color histograms between two consecutive frames;

Edge features using edges detected by a Canny edge detector in regions of interest;

Line features using lines detected by a probabilistic Hough Transform;

A histogram of textons;

Entropy features for each frame using a normalized intensity histogram and entropy differences for multiple frames;

Facial features such as a number of faces, or the size and aspect ratio of largest face region, with faces being detected by an extension of the AdaBoost classifier; and Shot boundary detection based features using differences of color histograms from consecutive frames.

Textual Features:

The feature extraction module 232 derives textual features from metadata of the videos in the training set. In one embodiment, the feature extraction module 232 infers likely clusters of words for the given textual metadata using Noisy-Or Bayesian networks.

Spatial and Temporal Features:

The videos in the training set may additionally have associated spatial and temporal data, such as global positioning system (GPS) coordinates and creation timestamps. In one embodiment, the feature extraction module 232 extracts features based on this spatial and/or temporal data.

It is appreciated that the above-described features are particularly suitable for characterizing the videos 117. In embodiments analyzing other types of digital objects, such as static images, audio files, or the like, a subset of the above-described features, or different types of features, may be suitable, as would be known to one of skill in the art.

The combination of the various features extracted from a particular video—e.g., concatenated in a specific order—serves as a feature vector that characterizes the video. The feature vectors for the videos of the training set and the validation set for a given video V are then used to train a video classifier for V and to validate the classifier's accuracy, as now further described.

The classifier training module 233 trains classifiers for each video V, each classifier taking an arbitrary video as input and outputting a degree of similarity between that video and V. More specifically, for each video V, classifier training module 233 provides the feature vector extracted by the feature extraction module 233 from the positive and negative training subsets produced by the partitioning module 231 as input to a training algorithm, which trains the corresponding video classifier. In one embodiment, the training algorithm is AdaBoost, the details of which are known to one having ordinary skill in the art. In other embodiments, other training algorithms such as linear support vector machine (SVM) are used.

The classifier training module 233 further quantifies the accuracy of the classifiers by applying each classifier to the validation set. Thus, in one embodiment, each classifier is applied to each video in the validation set (or some smaller subset thereof), and the output of the classifier, and whether the video is in the positive or negative validation set, are used to determine whether the classifier's similarity determination was accurate. Specifically, if the output produced by the classifier is not already Boolean—directly indicating whether or not the video represents the location—it may be mapped to a Boolean value. For example, in embodiments in which the classifiers produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match. If the classifier produces output indicating that a video is sufficiently similar to the video associated with the classifier, and the video is in fact in the positive training set, the classification is considered a true positive classification (TP). Similarly, classifier output indicating that a video in the negative validation set is in fact similar is considered a false positive (FP), output indicating that a video in the positive validation set is not similar is considered a false negative (FN), and output indicating that a video in the negative validation set is not similar is considered a true negative (TN). An overall accuracy can then be determined for the classifier, with classifiers lacking sufficient accuracy being discarded. In one embodiment, the accuracy is considered sufficient only if the precision and recall of the classifier are both above predetermined values, such as 0.7, where the precision P is defined as $P=TP/(TP+FP)$, and the recall R is defined as $R=TP/(TP+FN)$. In another embodiment, the accuracy is considered sufficient only if an F-score is above some predetermined threshold (e.g., 0.7), where the F-score F is defined as a function of the precision and recall, $F=2PR/(P+R)$.

The metadata transfer module 220 then uses the classifiers produced by the classifier training module 233 to add metadata to other target videos 117 that are lacking much, or any, metadata. Specifically, the metadata transfer module 220 applies the classifiers for one or more source videos having cluster weight metadata to a target video to determine a degree of similarity, adjusts the cluster weights of the source videos accordingly, and then combines the adjusted cluster weights with those of the target video. In one embodiment, the classifier produces a real number, with greater numbers indicating greater similarities, and the metadata transfer module 220 scales each a source video's cluster weights by this real number. For example, referring again to FIG. 3, the metadata transfer module 220 might apply the classifier for $V_2$ to $V_3$, determining that the degree of similarity between $V_2$ and $V_3$ is 0.7, and thus that weights of (0.7*0.6) and (0.7*0.9) derived from $V_2$ should be respectively added to the cluster weights A and B of video $V_3$.

As described above with respect to direct propagation techniques, the cluster weights from multiple nodes may be combined. For example, a classifier for $V_1$ might return a similarity of 0.8 for $V_3$, in which case the cluster weightings of $V_1$ reduced by a factor of 0.8 might be averaged with those derived from $V_2$ before associating them with $V_3$. In general, linear combination may be employed to create an average of the adjusted weightings of the source videos. Similarly, the original weightings of the target video (if any) may be linearly combined with the adjusted weights of the source videos, with, e.g., 40% of the final weight coming from the original target weights, and 60% from the average of the adjusted weights of the source videos.

Advantageously, use of video classifiers for metadata propagation permits the transfer of metadata to a video without relationships to other videos in the similarity graph 211. For example, video classifiers can be applied to a newly-uploaded video to determine additional metadata for the video, even though it does not yet have any co-play information with respect to the other videos in the video repository 116.

In one embodiment, the metadata transfer module 220 adds an indicator to the metadata of a video, indicating that the metadata is not original metadata supplied by the user, but rather has been transferred, at least in part, from other videos. For example, the cluster weights might be marked within the metadata as having been transferred at least in part from other videos, rather than being derived purely from the original user-supplied metadata.

In one embodiment, the metadata augmentation system 119 supplies a mechanism for review and approval of the transfer of metadata. For example, the user that originally uploaded a video might be prompted, either before or after the transfer of metadata, and either on a video-by-video basis or as a general preference setting applicable to all videos, to confirm the transfer of the metadata.

Figure 4:
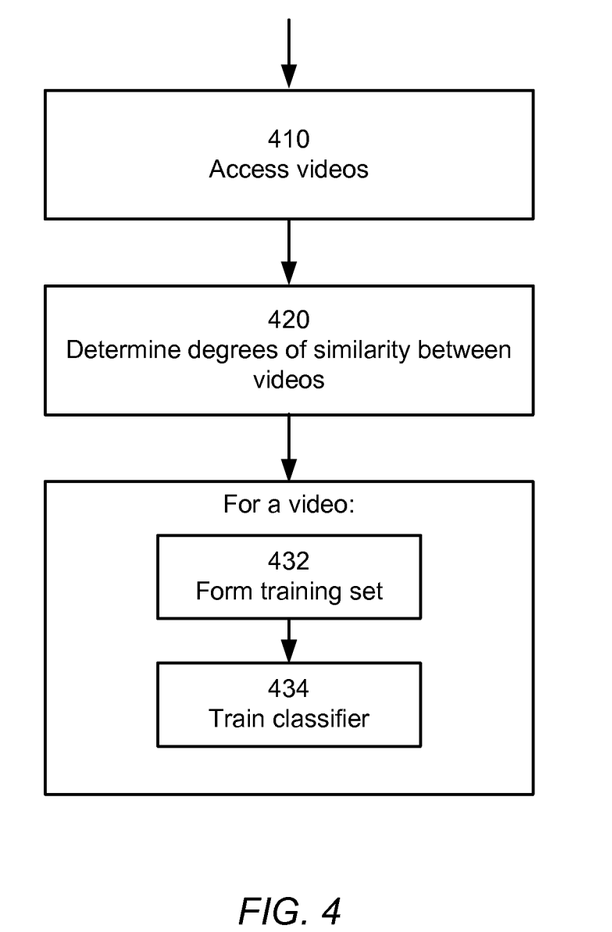
FIG. 4 is a flowchart illustrating a high-level view of steps carried out by the metadata augmentation system for training a classifier for a video or other digital object, according to one embodiment.

FIG. 4 is a flowchart illustrating a high-level view of steps carried out by the metadata augmentation system 119 for training a classifier for a video or other digital object, according to one embodiment. In step 410, the metadata augmentation system 119 accesses a set of videos (or other digital objects) for which the metadata is to be augmented. The videos may be stored locally within the video repository 16 of the video hosting service 100, or they may be stored on a remote system and accessed via the network 140.

In step 420, the similarity determination module 210 determines degrees of similarity between pairs of the different digital objects, such as the videos 117 discussed above. The similarity is computed in different manners in different embodiments, such as performing object content or metadata analysis, or using co-play counts in the case of video objects. In one embodiment, the determined similarity degrees are used to construct the similarity graph 211 of FIG. 2.

In step 432, for each of a plurality of the videos (or other digital objects), the partitioning module 231 forms a training set for the video, and the feature extraction module 232 extracts relevant features from the various videos of the training set, as described above with respect to FIG. 2.

In step 434, the classifier training module 233 trains a classifier for the video using the features extracted from the training set, as described above with respect to FIG. 2. The trained classifier then outputs an indication of whether, and/or to what extent, an arbitrary video is similar to the video for which the classifier was trained.

Figure 5:
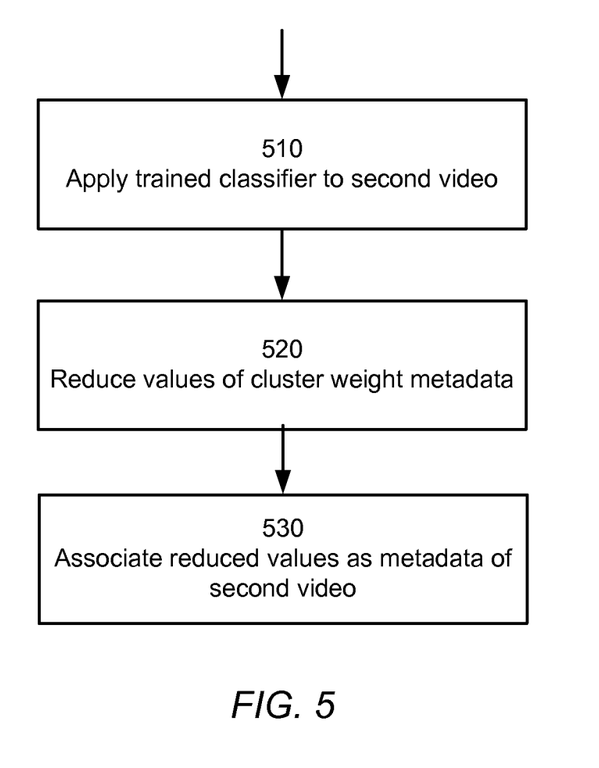
FIG. 5 is a flowchart illustrating a high-level view of steps carried out by the metadata augmentation system for augmenting metadata of a video or other digital object using the classifiers trained during the steps of FIG. 4.

FIG. 5 is a flowchart illustrating a high-level view of steps carried out by the metadata augmentation system 119 for augmenting metadata of a video or other digital object using the classifiers trained during the steps of FIG. 4. In step 510, the metadata transfer module 220 of the metadata augmentation system 119 applies the classifier trained for a first video to a second video, obtaining a degree of similarity between the first and second video.

If the degree of similarity is sufficiently great (e.g., above some threshold value in the case of scalar similarity degrees, or "true" in the case of Boolean similarity values), then in step 420 the metadata transfer module 220 reduces the values of cluster weight metadata derived from textual metadata of the first video based on the degree of similarity, reducing the individual cluster weights less for greater degrees of similarity, and more for lesser degrees of similarity. In step 530, the metadata transfer module 220 associates the reduced values of the cluster weight metadata with the second one of the videos, as described above with respect to FIG. 2.

The process of FIGS. 4-5 results in a more robust set of augmented metadata for videos (e.g., adjusted cluster weights), which can then be used for various purposes. For example, the augmented metadata can be used to better find objects of interest to a user, e.g., in response to a user query for objects having given properties that can be described by the metadata. For instance, the adjusted cluster weights can act as one factor when evaluating user queries, thus influencing the query output. As another example, the augmented metadata provides additional information and thus more descriptive feature vectors that can be extracted from metadata by the feature extraction module 232. Thus, in one embodiment the video hosting service 100 extracts these metadata feature vectors and uses them, either by themselves or in combination with other features, to train additional classifiers, such as concept classifiers for recognizing a particular concept, such as a particular sport, a particular genre of television show, and the like. In one embodiment, the video hosting service 100 trains concept classifiers by forming positive and negative training sets of videos for each of a set of possible concepts based in part on whether the video metadata contains a corresponding keyword, and applying an ensemble learning algorithm such as AdaBoost or Linear SVM to the positive and negative training sets.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    accessing a set of videos;
    determining degrees of similarity between pairs of the videos;
    for each video of a plurality of the videos, training a classifier for the video, the training comprising:
        forming, for the video, a training set comprising other ones of the videos based at least in part on the degrees of similarity; and
        training the classifier for the video based at least in part on audiovisual features extracted from the videos in the training set;
    applying the trained classifier for a first one of the videos to a second one of the videos to determine a degree of similarity between the second one of the videos and the first one of the videos; and
    responsive to the degree of similarity determined by applying the trained classifier being above a threshold value:
        based on the degree of similarity determined by applying the trained classifier, reducing cluster weights derived from user-supplied textual metadata of the first one of the videos, thereby obtaining first reduced cluster weight metadata; and
        associating the first reduced cluster weight metadata as metadata of the second one of the videos.

2. The computer-implemented method of claim 1, further comprising:
    applying the trained classifier for a third one of the videos to the second one of the videos to determine whether the third one of the videos is similar to the second one of the videos; and
    responsive to the third one of the videos being similar to the second one of the videos:
        based on a degree of similarity between the second and third videos, reducing cluster weights derived from user-supplied textual metadata of the third one of the videos, thereby obtaining second reduced cluster weight metadata;
        combining the second reduced cluster weight metadata with the first reduced cluster weight metadata; and
        associating the combined reduced cluster weight metadata as metadata of the second one of the videos.

3. The computer-implemented method of claim 1, wherein forming the training set for the video comprises:
    creating a similarity graph comprising:
        ones of the videos, and
        edges between pairs of the videos, the edges associated with the determined degrees of similarity of the pairs;
    computing path degrees of similarity between the video and other ones of the videos based on a predetermined decay factor and on shortest path lengths between the video and the other ones of the videos; and
    adding videos to the training set based on their computed path degrees of similarity with the video.

4. The computer-implemented method of claim 1, wherein forming the training set for the video comprises:
    creating a similarity graph comprising:
        ones of the videos, and
        edges between pairs of the videos, the edges associated with the determined degrees of similarity of the pairs;
    computing path degrees of similarity between the video and other ones of the videos based on products of the degrees of similarity associated with the edges on a path between the video and the others one of the videos; and
    adding videos to the training set based on their computed path degrees of similarity with the video.

5. The computer-implemented method of claim 1, wherein the degrees of similarity between pairs of the videos are determined based on co-play counts of the videos in the pair.

6. The computer-implemented method of claim 1, wherein the degrees of similarity between pairs of the videos are determined based on comparisons between content of the videos in the pair.

7. The computer-implemented method of claim 1, wherein associating the first reduced cluster weight metadata as metadata of the second one of the videos comprises:
    obtaining the first reduced cluster weight metadata by scaling the cluster weights derived from user-supplied textual metadata of the first one of the videos by the degree of similarity; and
    obtaining combined cluster weight metadata by adding the scaled cluster weights to cluster weights derived from user-supplied textual metadata of the second one of the videos;
    storing the combined cluster weight metadata in association with the second one of the videos.

8. The computer-implemented method of claim 1, wherein associating the first reduced cluster weight metadata as metadata of the second one of the videos comprises:
    obtaining the first reduced cluster weight metadata by scaling the cluster weights derived from user-supplied textual metadata of the first one of the videos by the degree of similarity; and
    responsive to the second one of the videos lacking user-supplied textual metadata, storing the first reduced cluster weight metadata in association with the second one of the videos.

9. The computer-implemented method of claim 1, further comprising prompting a user that uploaded the second one of the videos to approve association of the first reduced cluster weight metadata as metadata of the second one of the videos.

10. A non-transitory computer-readable storage medium having executable computer program instructions embodied therein, actions of the computer program instructions comprising:
    accessing a set of digital objects;

determining degrees of similarity between pairs of the objects; and for each object of a plurality of the objects, training a classifier for the object, the training comprising:
   forming, for the object, a training set comprising other ones of the objects based at least in part on the degrees of similarity; and
   training the classifier for the object based at least in part on features extracted from the objects in the training set;

applying the trained classifier for a first one of the objects to a second one of the objects to determine a degree of similarity between the second one of the objects and the first one of the objects; and responsive to the degree of similarity being above a threshold value:
   based on the degree of similarity, reducing cluster weights derived from user-supplied textual metadata of the first one of the objects, thereby obtaining first reduced cluster weight metadata; and
   associating the first reduced cluster weight metadata as metadata of the second one of the objects.

11. The non-transitory computer-readable storage medium of claim 10, further comprising:
   applying the trained classifier for a third one of the objects to the second one of the objects to determine whether the third one of the objects is similar to the second one of the objects; and
   responsive to the third one of the objects being similar to the second one of the objects:
      based on a degree of similarity between the second and third objects, reducing cluster weights derived from user-supplied textual metadata of the third one of the objects, thereby obtaining second reduced cluster weight metadata;
      combining the second reduced cluster weight metadata with the first reduced cluster weight metadata values; and
      associating the combined reduced cluster weight metadata as metadata of the second one of the objects.

12. The non-transitory computer-readable storage medium of claim 10, wherein forming the training set for the object comprises:
   creating a similarity graph comprising:
      ones of the objects, and
      edges between pairs of the objects, the edges associated with the determined degrees of similarity of the pairs;
   computing path degrees of similarity between the object and other ones of the objects based on a predetermined decay factor and on shortest path lengths between the object and the other ones of the objects; and
   adding objects to the training set based on their computed path degrees of similarity with the object.

13. The non-transitory computer-readable storage medium of claim 8, wherein forming the training set for the object comprises:
   creating a similarity graph comprising:
      ones of the objects, and
      edges between pairs of the objects, the edges associated with the determined degrees of similarity of the pairs;
   computing path degrees of similarity between the object and other ones of the objects based on products of the degrees of similarity associated with the edges on a path between the object and the others one of the objects; and
   adding objects to the training set based on their computed path degrees of similarity with the object.

14. The non-transitory computer-readable storage medium of claim 10, wherein the degrees of similarity between pairs of the objects are determined based on co-play counts of the videos in the pair.

15. A computer system comprising:
   a computer processor; and
   a computer-readable storage medium storing a computer program executable by the computer processor and performing actions comprising:
      accessing a set of videos;
      determining degrees of similarity between pairs of the videos; and
      for each video of a plurality of the videos, training a classifier for the video, the training comprising:
         forming, for the video, a training set comprising other ones of the videos based at least in part on the degrees of similarity; and
         training the classifier for the video based at least in part on audiovisual features extracted from the videos in the training set;
      applying the trained classifier for a first one of the videos to a second one of the videos to determine a degree of similarity between the second one of the videos and the first one of the videos; and
      responsive to the degree of similarity being above a threshold value:
         based on the degree of similarity, reducing cluster weights derived from user-supplied textual metadata of the first one of the videos, thereby obtaining first reduced cluster weight metadata; and
         associating the first reduced cluster weight metadata as metadata of the second one of the videos.

16. The computer system of claim 15, the actions further comprising:
   applying the trained classifier for a third one of the videos to the second one of the videos to determine whether the third one of the videos is similar to the second one of the videos; and
   responsive to the third one of the videos being similar to the second one of the videos:
      based on a degree of similarity between the second and third videos, reducing cluster weights derived from user-supplied textual metadata of the third one of the videos, thereby obtaining second reduced cluster weight metadata;
      combining the second reduced cluster weight metadata values with the first reduced cluster weight metadata; and
      associating the combined reduced cluster weight metadata as metadata of the second one of the videos.

17. The computer system of claim 15, wherein forming the training set for the video comprises:
   creating a similarity graph comprising:
      ones of the videos, and
      edges between pairs of the videos, the edges associated with the determined degrees of similarity of the pairs;
   computing path degrees of similarity between the video and other ones of the videos based on a predetermined decay factor and on shortest path lengths between the video and the other ones of the videos; and
   adding videos to the training set based on their computed path degrees of similarity with the video.

* * * * *